(12) United States Patent
Patterson

(10) Patent No.: US 10,315,613 B2
(45) Date of Patent: Jun. 11, 2019

(54) PEDESTRIAN PROTECTION AUTOMOTIVE HINGE

(71) Applicant: Multimatic, Inc., Markham (CA)

(72) Inventor: Patrick Patterson, Norwich (GB)

(73) Assignee: Multimatic Inc., Markham (CA)

( * ) Notice: Subject to any disclaimer, the term of this patent is extended or adjusted under 35 U.S.C. 154(b) by 147 days.

(21) Appl. No.: 15/524,311

(22) PCT Filed: Jun. 3, 2016

(86) PCT No.: PCT/US2016/035769
§ 371 (c)(1),
(2) Date: May 4, 2017

(87) PCT Pub. No.: WO2017/003641
PCT Pub. Date: Jan. 5, 2017

(65) Prior Publication Data
US 2017/0369028 A1 Dec. 28, 2017

Related U.S. Application Data

(60) Provisional application No. 62/186,127, filed on Jun. 29, 2015.

(51) Int. Cl.
*B60R 21/38* (2011.01)
*B62D 25/12* (2006.01)
(Continued)

(52) U.S. Cl.
CPC ............... *B60R 21/38* (2013.01); *B62D 25/12* (2013.01); *E05D 3/06* (2013.01); *E05D 11/08* (2013.01);
(Continued)

(58) Field of Classification Search
CPC ........... B60R 21/38; E05D 11/10; E05D 3/06; E05D 11/08; B62D 25/12; E05Y 2900/536
See application file for complete search history.

(56) References Cited

U.S. PATENT DOCUMENTS 6,834,735 B2   12/2004   Kim
7,552,789 B2    6/2009   Gust
(Continued)

FOREIGN PATENT DOCUMENTS

DE       19712961 A1    10/1998
DE    102005054494 A1     5/2007
(Continued)

OTHER PUBLICATIONS

Japanese Office Action for Japanese Application No. 2017-558683 dated Nov. 2, 2018.
(Continued)

*Primary Examiner* — Darlene P Condra
(74) *Attorney, Agent, or Firm* — Carlson, Gaskey & Olds, P.C.

(57) ABSTRACT

A pedestrian protection automotive hinge includes a release assembly which includes a clip supported at one of the first and second opposing ends of a slot in one of first and second members, and a stop pin supported by the other of the first and second members. The stop pin is captured in the clip in the normally closed position and the normally opened position. An actuator is configured to engage the second member and to force the second member upward relative to the first member in response to a collision input. The stop pin is configured to break the clip in response to this force permitting the second member to pivot about a member pin relative to the first member to an opened hood collision position and the stop pin to move to the end of the slot opposite the clip.

18 Claims, 4 Drawing Sheets

(51) Int. Cl.
*E05D 3/06* (2006.01)
*E05D 11/08* (2006.01)
*E05D 11/10* (2006.01)

(52) U.S. Cl.
CPC ......... *E05D 11/10* (2013.01); *E05Y 2900/536* (2013.01)

(56) References Cited

U.S. PATENT DOCUMENTS

| | | | |
|---|---|---|---|
| 7,596,833 | B2 | 10/2009 | Erwin |
| 8,939,249 | B2 | 1/2015 | Kuhr et al. |
| 2007/0062747 | A1 | 3/2007 | Erwin |
| 2012/0084942 | A1 | 4/2012 | Mehta et al. |
| 2013/0025958 | A1* | 1/2013 | McIntyre ................ B60R 21/38 180/274 |
| 2013/0074284 | A1 | 3/2013 | Kuhr |
| 2013/0227818 | A1 | 9/2013 | Zippert et al. |
| 2014/0182962 | A1* | 7/2014 | McIntyre, I ............. B60R 21/38 180/274 |
| 2014/0259531 | A1 | 9/2014 | Carothers et al. |
| 2017/0009495 | A1* | 1/2017 | Scholz .................... E05B 81/21 |
| 2017/0282847 | A1* | 10/2017 | Jenny ..................... B60R 21/38 |
| 2017/0327074 | A1* | 11/2017 | Schabenberger ....... B60R 21/38 |

FOREIGN PATENT DOCUMENTS

| | | |
|---|---|---|
| DE | 102008034097 A1 | 1/2010 |
| DE | 102008046145 A1 | 3/2010 |
| DE | 102008050678 A1 | 4/2010 |
| DE | 102008058186 A1 | 5/2010 |
| DE | 102009025131 A1 | 12/2010 |
| DE | 102009040401 A1 | 3/2011 |
| DE | 102009040405 A1 | 3/2011 |
| DE | 102009040406 A1 | 3/2011 |
| DE | 102009040407 A1 | 3/2011 |
| DE | 102009040410 A1 | 3/2011 |
| DE | 102009040411 A1 | 3/2011 |
| DE | 102009040413 A1 | 3/2011 |
| DE | 102009040415 A1 | 3/2011 |
| DE | 102009040416 A1 | 3/2011 |
| DE | 102009040417 A1 | 3/2011 |
| DE | 102010002955 A1 | 9/2011 |
| DE | 102010029039 A1 | 11/2011 |
| DE | 102010029719 A1 | 12/2011 |
| DE | 102010030272 A1 | 12/2011 |
| DE | 102011006133 A1 | 9/2012 |
| DE | 102011075267 A1 | 11/2012 |
| EP | 1293416 A3 | 3/2003 |
| EP | 1295762 B1 | 3/2003 |
| EP | 1293400 B1 | 3/2004 |
| EP | 1394000 B1 | 3/2004 |
| EP | 1516787 A1 | 3/2005 |
| EP | 1637411 A3 | 3/2006 |
| EP | 1637411 B1 | 3/2006 |
| EP | 1688340 A1 | 8/2006 |
| EP | 1752344 A1 | 2/2007 |
| EP | 2138362 B1 | 12/2009 |
| EP | 2397378 A3 | 12/2011 |
| EP | 2634047 A1 | 9/2013 |
| EP | 2777992 A1 | 9/2014 |
| EP | 2796328 A1 | 10/2014 |
| KR | 1020140121987 A | 10/2014 |
| WO | 2001026811 A1 | 3/2011 |

OTHER PUBLICATIONS

International Preliminary Report for Patentability for PCT/US2016/035769, dated Jan. 11, 2018.
International Search Report and Written Opinion for PCT/US2016/035769, dated Sep. 14, 2016.
Chinese Search Report for Chinese Application No. 201680024397.5 dated Jan. 22, 2019.
Korean Office Action for Korean Application No. 10-2017-7034957 dated Feb. 1, 2019.

* cited by examiner

PEDESTRIAN PROTECTION AUTOMOTIVE HINGE

CROSS-REFERENCE TO RELATED APPLICATIONS

This application claims priority to U.S. Provisional Application No. 61/186,127, which was filed on Jun. 29, 2015 and is incorporated herein by reference.

BACKGROUND

This disclosure relates to a pedestrian protection automotive hinge.

The automotive industry is expanding its adoption of pedestrian protection features on automobiles. One such feature is to make the front of the vehicle, in particular the hood, more compliant during a frontal impact with a pedestrian.

One approach for absorbing a pedestrian impact with the hood is to deploy actuators associated with the hood hinges to raise the hood slightly, creating a crumple zone between the hood and the engine compartment. Typically pyrotechnical actuators common with other vehicle safety systems such as seat belt pre-tensioners are used.

Since the hinges need to maintain their normal function, the hinges incorporate a release assembly, which retains desired structural relationship between the hinge's components during a normal hinge operating state, but selectively enables certain elements of the hinge to move relative to one another when the actuators are deployed. Once the hood is raised slightly during a pedestrian impact event, the hood must be held ajar since the pyrotechnical actuators release pressure after actuation (for safety reasons) and are unable to maintain the hood in this slightly opened position.

Another approach, in vehicles with smaller displacement engines, leaves the hood closed during a pedestrian impact event. A sufficient crumple zone between the closed hood and the small engine permits the hood to collapse into the engine compartment without the need of an actuator during a pedestrian impact.

One example hood hinge for small engine applications utilizes a pair of linkages interconnecting upper and lower hinges. One of the linkages includes an elongated slot within which a clip is held. The clip receives a pin that acts as a pivot point during normal hinge and hood operation. During a pedestrian impact event, the clip breaks permitting the pin to move upward in the slot as the hood collapses.

SUMMARY

In one exemplary embodiment, a pedestrian protection automotive hinge includes a first hinge portion. A second hinge portion includes first and second members secured to one another by a member pin. One of the first and second members has a slot with opposing first and second ends. First and second linkages are spaced apart from one another and each pivotally interconnected to the first hinge portion and the first member. The first and second linkages are configured to permit movement of the first and second hinge portions relative to one another between a normal closed hood position and a normal opened hood position. A release assembly includes a clip supported at one of the first and second ends and a stop pin supported by the other of the one of the first and second members. The stop pin is captured in the clip in the normally closed position and the normally opened position. The stop pin is configured to break the clip in response to a collision input permitting the second member to pivot about the member pin relative to the first member to an opened hood collision position and the stop pin to move to the second end of the slot. An actuator system that includes an actuator is configured to engage the second member and move the second member upward relative to the first member in response to the collision input and break the clip.

In a further embodiment of the above, the first member includes the slot and the stop pin is rigidly mounted to the second member.

In a further embodiment of any of the above, the first hinge portion is configured to be mounted to a body. The second hinge portion is configured to be mounted to a hood. The second end is arranged above the first end.

In a further embodiment of any of the above, the clip is constructed from a plastic material. The clip has a frangible connection that provides a weakened area configured to break.

In a further embodiment of any of the above, there is a hold assembly that includes a spring tab on one of the first and second members and a ramp on the other of the one of the first and second members. The spring tab and ramp are in an overlapping relationship in the normal closed hood position and the normal opened hood position. The spring tab and ramp are configured to slide relative to one another while the second member pivots about the member pin relative to the first member to an opened hood collision position in response to a collision input. The spring tab engages a hold surface in the opened hood collision position and maintains an angular position between the first and second members.

In another exemplary embodiment, a pedestrian protection automotive hinge includes a first hinge portion. A second hinge portion includes first and second members secured to one another by a member pin. One of the first and second members has a slot with opposing first and second ends. First and second linkages are spaced apart from one another and each pivotally interconnected to the first hinge portion and the first member. The first and second linkages are configured to permit movement of the first and second hinge portions relative to one another between a normal closed hood position and a normal opened hood position. A hold assembly includes a spring tab on one of the first and second members and a ramp on the other of the one of the first and second members. The spring tab and ramp are in an overlapping relationship in the normal closed hood position and the normal opened hood position. The spring tab and ramp are configured to slide relative to one another while the second member pivots about the member pin relative to the first member to an opened hood collision position in response to a collision input. The spring tab engages a hold surface in the opened hood collision position and maintains an angular position between the first and second members.

In a further embodiment of any of the above, the spring tab and ramp respectively provide first and second surfaces that engage one another and that are configured to provide an increasing resistive force during deployment of the second member relative to the first member in response to the collision input.

In a further embodiment of any of the above, the spring tab is configured to be deflected away from the first member when pivoting the second member about the member pin relative to the first member.

In a further embodiment of any of the above, the spring tab is configured to be deflected toward the first member to a seated position and beyond a position of the spring tab in an overlapping relationship with the ramp.

In a further embodiment of any of the above, the spring tab includes an end abutting a hold surface provided on the first member.

In a further embodiment of any of the above, a release assembly that includes a clip is supported at one of the first and second ends. A stop pin is supported by the other of the one of the first and second members. The stop pin is captured in the clip in the normally closed position and the normally opened position. The stop pin is configured to break the clip in response to a collision input permitting the second member to pivot about the member pin relative to the first member to a opened hood collision position and the stop pin to move to the second end of the slot.

In another exemplary embodiment, a method of deploying a pedestrian protection automotive hinge includes the step of activating an actuator in response to a collision input to drive a vehicle hood upward. A clip is broken with a stop pin and the stop pin is moved along a slot while pivoting a second member relative to a first member about a member pin. The vehicle hood is held in an opened hood collision position.

In a further embodiment of any of the above, the second member is engaged with the actuator to initiate the breaking step.

In a further embodiment of any of the above, the stop pin is moved downward in a slot.

In a further embodiment of any of the above, the holding step includes seating a spring tab on a hold surface.

In another exemplary embodiment, a method of deploying a pedestrian protection automotive hinge includes the steps of activating an actuator in response to a collision input to drive a vehicle hood upward. A spring tab is slid relative to a ramp while pivoting a second member relative to a first member about a member pin. The vehicle hood is held in an opened hood collision position by seating the spring tab on a hold surface.

In a further embodiment of any of the above, the spring tab sliding step includes deflecting the spring tab with the ramp away from the first member.

In a further embodiment of any of the above, the holding step includes seating an end of the spring tab onto a hold surface of the first member to maintain the opened hood collision position.

In a further embodiment of any of the above, a clip is broken with a stop pin and the stop pin is moved along a slot while pivoting a second member relative to a first member about a member pin.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
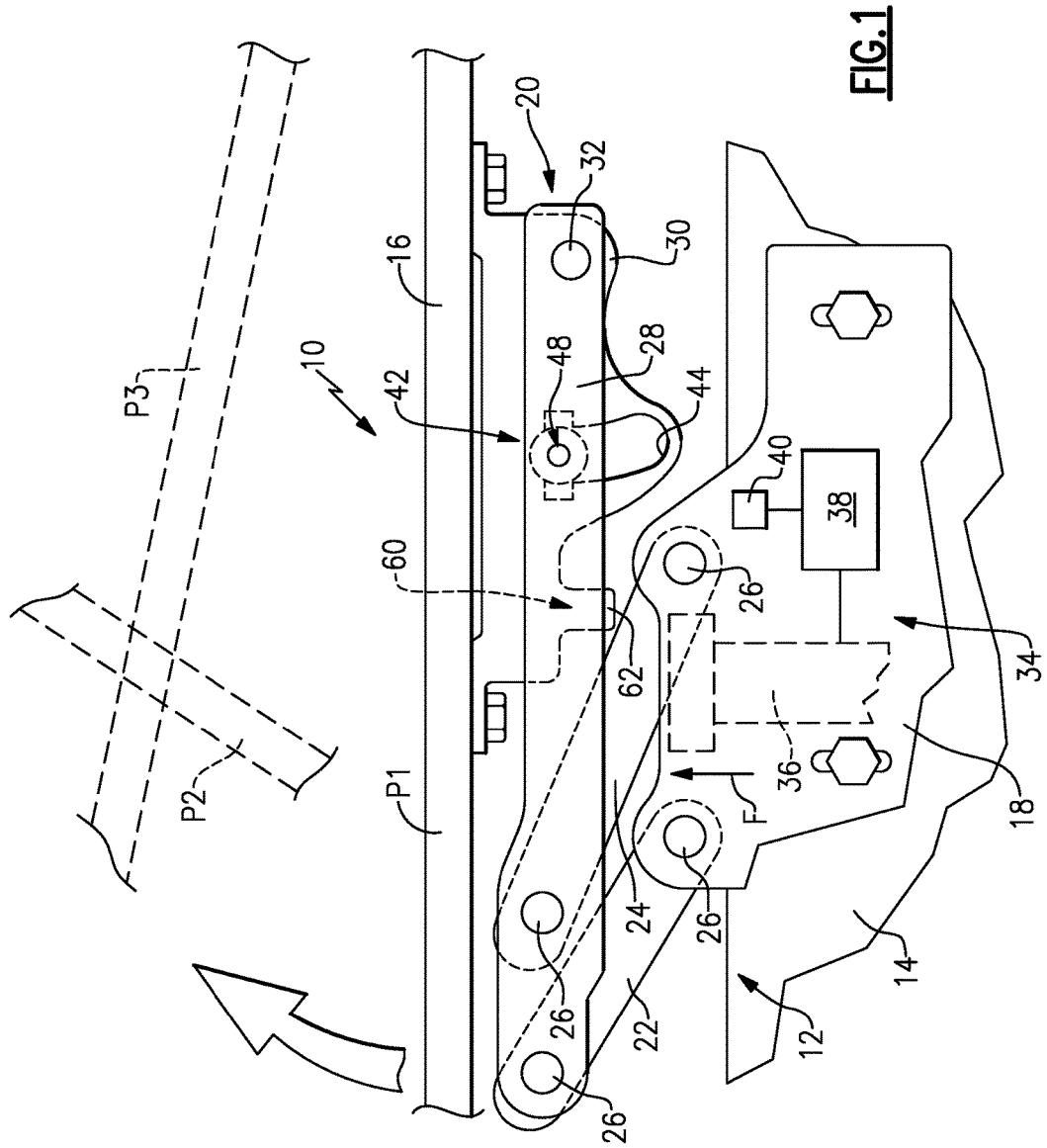
FIG. 1 is a side view of an example pedestrian protection automotive hinge supporting a hood.
Figure 2:
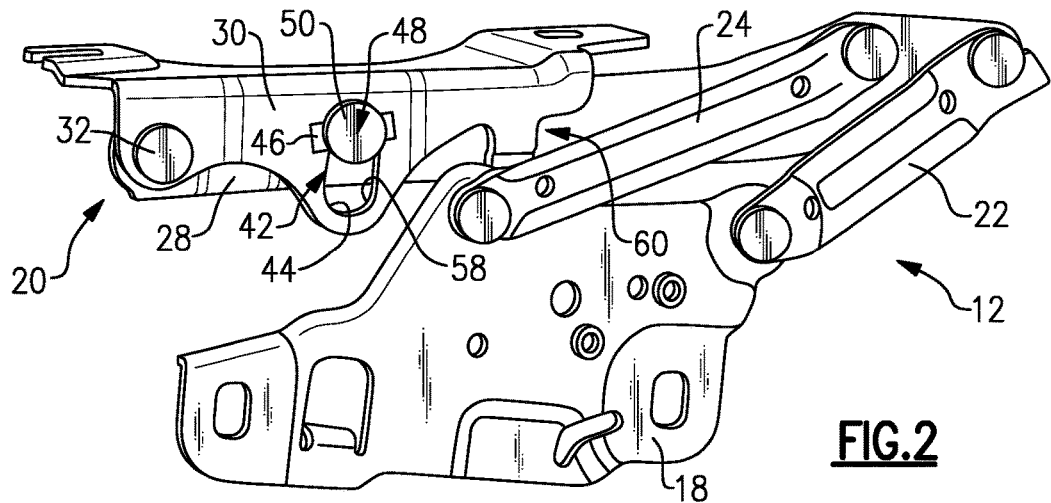
FIG. 2 is a perspective view of the hinge shown in FIG. 1 from an opposite side and in a position in which the hood would be in a normal closed hood position.

A portion of a vehicle 10 is illustrated in FIG. 1. The vehicle 10 includes a hood 16 supported relative to a body 14, which is a sidewall of an engine compartment, by a hinge 12. The hood 16 is closed with respect to the body 14 in a position P1 to provide a normal closed hood position. The hood 16 is opened during a normal hinge operating state of the hinge 12 to a fully opened position P2 corresponding to a normal opened hood position to provide access to the engine compartment for maintenance.

During a pedestrian collision event, the hood 16 is partially raised to a position P3 corresponding to an opened hood collision position to better absorb the impact of the pedestrian and enhance pedestrian protection.

The hinge 12 includes a first hinge portion 18 mounted to the body 14. A second hinge portion 20 is interconnected to the first hinge portion 18 by first and second linkages 22, 24, which each have opposing ends secured to the first and second hinge portions 18, 20 by linkage pins 26 that permit these elements to pivot relative to one another.

The second hinge portion 20 includes first and second members 28, 30 that move in unison with one another during the normal hinge operating state. The first and second members 28, 30 are joined by a member pin 32 to permit rotation of the second member 30 relative to the first member 28 in response to a pedestrian collision input.

An actuator assembly 34 includes an actuator 36 that is in communication with the controller 38. A sensor 40 detects information indicative of a pedestrian collision or impending pedestrian collision with the front of the vehicle and communicates this information to the controller 38. When the controller 38 determines it is desirable to partially raise the hood 16 from position P1 to position P3 to absorb a pedestrian impact, the actuator 36 is fired driving a portion of the actuator 36 upward to engage the second member 30, as indicated by arrow F.

Impact of the actuator 36 with the second member 30 causes a release assembly 42 to permit the second member 30 to rotate about the member pin 32 with respect to the first member 28. Once the hood 16 reaches the position P3, a hold assembly 60 maintains the hood 16 in the position P3 to absorb the pedestrian impact.

Referring to FIGS. 2-4B, the release assembly 42 includes a slot 44 provided in the second member 30. A clip 46 is mounted to the second member 30 and arranged within the slot 44 at a first end 56. A stop pin 48 is affixed to the first member 28 and includes a neck 52 that extends through an aperture in the clip 46. A head 50 is provided at an end of the neck 52.

When the actuator 36 fires in response to the collision input, the second member 30 is driven upward, breaking the plastic clip 46 at frangible connections 54 that provide weakened regions. The stop pin 48 is moved to a second end 58 of the slot 44 in the opened hood collision position.

The hold assembly 60 is shown in more detail in FIGS. 2, 3 and 5A-6B. In one example, the hold assembly 60 includes a spring tab 62 extending from the second member 30 and overlapping the first member 28 in the normal closed hood position and the normal open hood position during the normal hinge operating state. The first member 28 includes a ramp 64 providing a second surface 72 that engages a first surface 70 of the spring tab 62. The spring tab 62 and ramp 64 slide relative to one another when the second member 30 pivots about the member pin 32 relative to the first member 28 to an open hood collision position in response to the collision input. Friction is created between the first and second surfaces 70, 72. The friction increases with displacement and provides a controlled deceleration and arresting force as the hood 16 moves upward. This controlled deceleration is desirable to prevent violent "hood flutter" and increased pedestrian contact acceleration as the system reaches its end stop during the pedestrian impact event. Thus, it is desirable is to push the hood up as quickly as possible and bring it to a stop as gently as possible—all within about 30 ms.

The spring tab 62 deflects away from the first member 28 in a first direction D1 when pivoting the second member 30 about the member pin 32 relative to the first member 28. The spring tab 62 deflects toward the first member 28 in a second direction D2 to a seated position that is beyond the original position of the spring tab 62 when it overlapped the ramp 64 in the normal hinge operating state.

Figure 3:
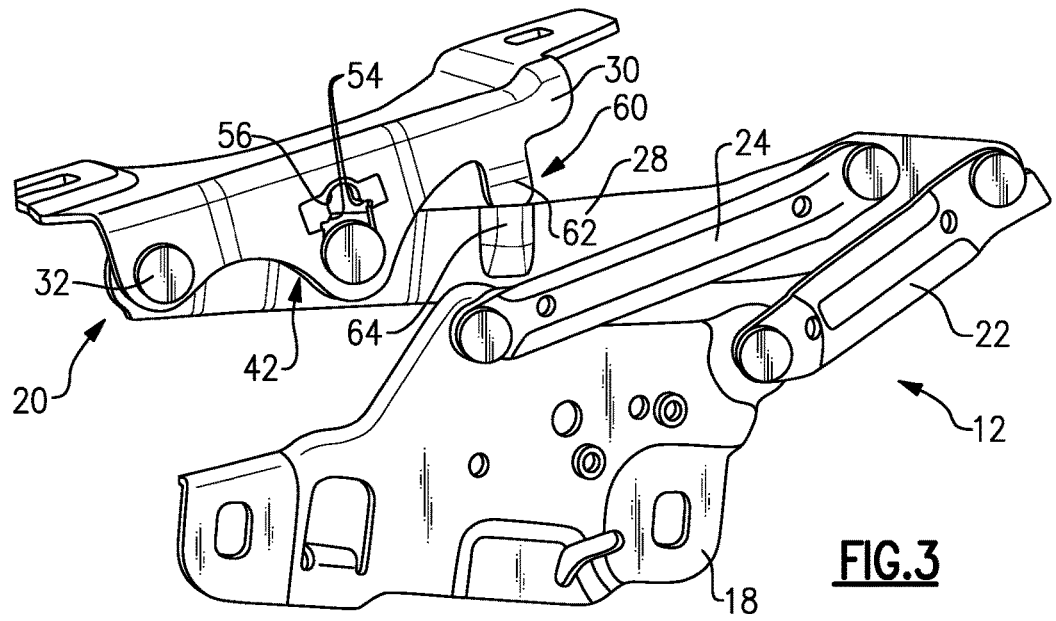
FIG. 3 is a perspective view of the hinge shown in FIG. 2, but in a position corresponding to the hood in an opened hood collision position.
Figure 4A:
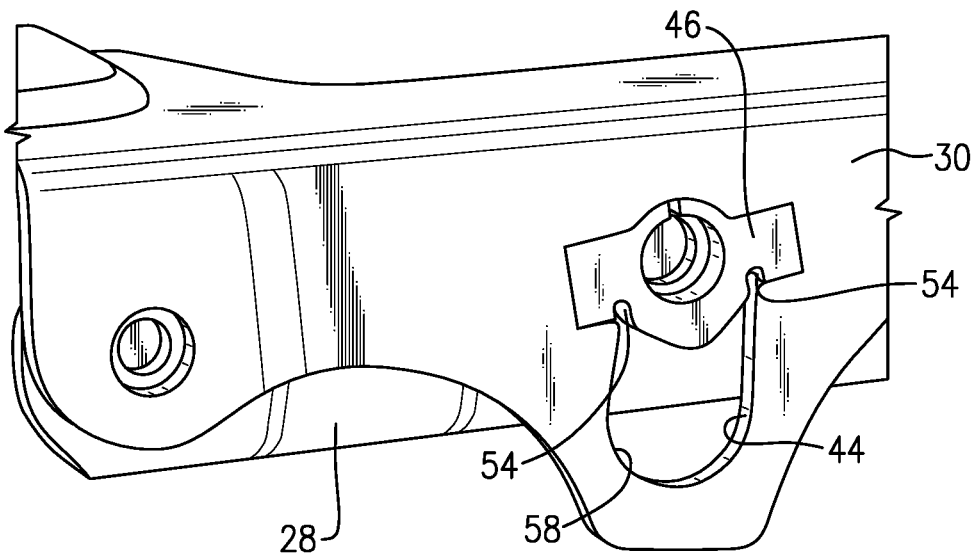
FIG. 4A illustrates first and second members of a second hinge portion with a stop pin removed to reveal a clip.
Figure 4B:
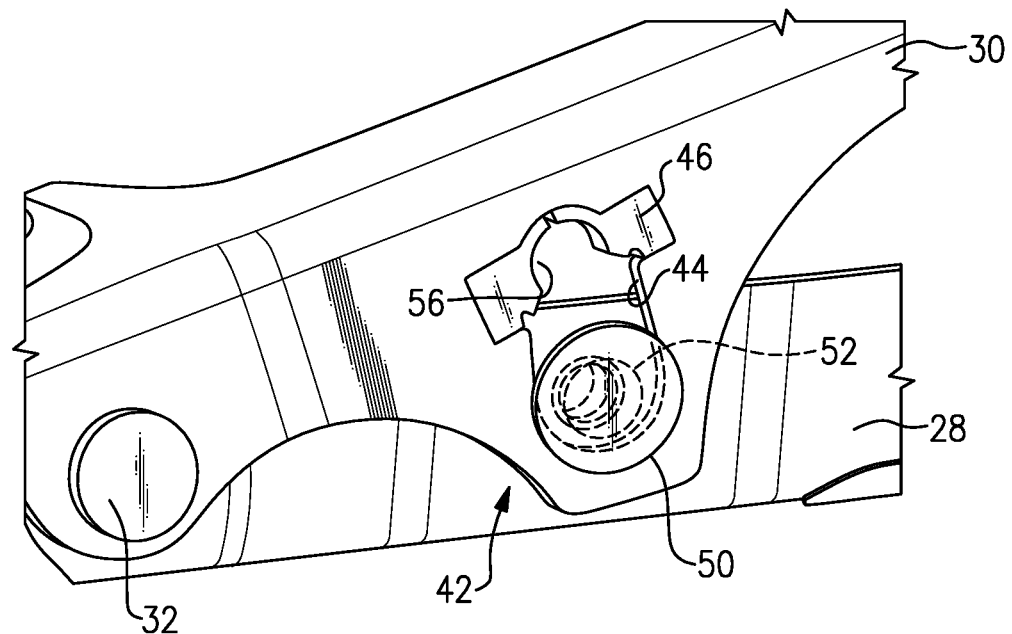
FIG. 4B depicts the first and second members shown in FIG. 4A with the clip broken, corresponding to the opened hood collision position.
Figure 5A:
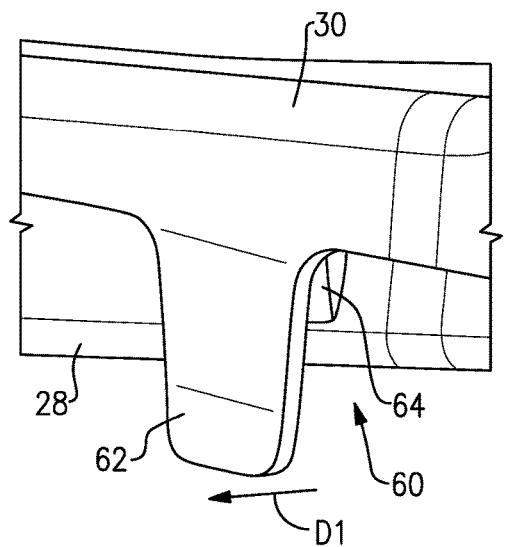
FIG. 5A illustrates a hold assembly in a normal hinge operating state.
Figure 5B:
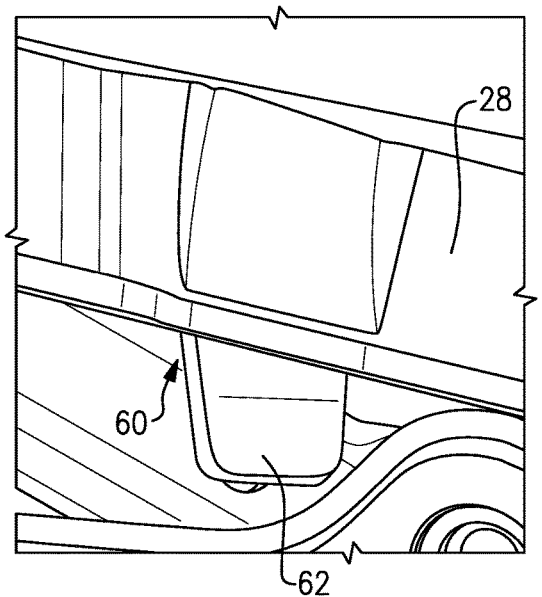
FIG. 5B illustrates the hold assembly from an opposing side compared to FIG. 5A.
Figure 6A:
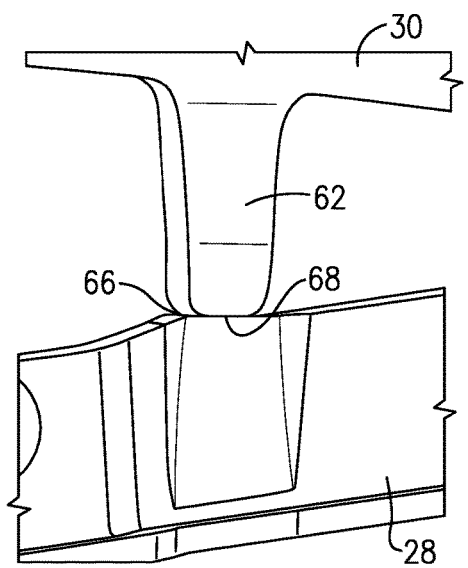
FIG. 6A illustrates the hold assembly with a tab seated on a hold surface, which corresponds to the opened hood collision position.
Figure 6B:
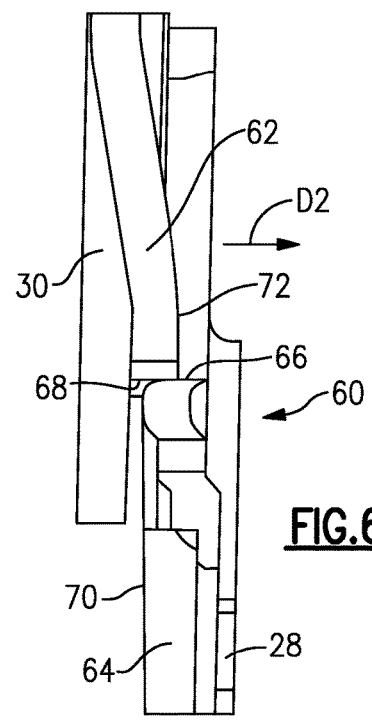
FIG. 6B is an end view of the hold assembly shown in FIG. 6A.

The spring tab has an end 68 that engages a hold surface 66 of the first member 28 in the opened hood collision position P3, which maintains an angular position between the first and second members 28, 30 as best shown in FIG. 3.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A pedestrian protection automotive hinge comprising:
   a first hinge portion;
   a second hinge portion includes first and second members secured to one another by a member pin, one of the first and second members has a slot with opposing first and second ends;
   first and second linkages spaced apart from one another and each pivotally interconnected to the first hinge portion and the first member, the first and second linkages configured to permit movement of the first and second hinge portions relative to one another between a normal closed hood position and a normal opened hood position;
   a release assembly includes a clip supported at one of the first and second ends, and a stop pin supported by the other of the one of the first and second members, the stop pin captured in the clip in the normally closed position and the normally opened position, the stop pin configured to break the clip in response to a collision input permitting the second member to pivot about the member pin relative to the first member to an opened hood collision position and the stop pin to move to the second end of the slot; and
   an actuator system that includes an actuator configured to engage the second member and move the second member upward relative to the first member in response to the collision input and break the clip.

2. The hinge according to claim 1, wherein the first member includes the slot, and the stop pin is rigidly mounted to the second member.

3. The hinge according to claim 1, wherein the first hinge portion is configured to be mounted to a body, and the second hinge portion is configured to be mounted to a hood, the second end arranged above the first end.

4. The hinge according to claim 1, wherein the clip is constructed from a plastic material, the clip has a frangible connection providing a weakened area configured to break.

5. The hinge according to claim 1, comprising a hold assembly that includes a spring tab on one of the first and second members, and a ramp on the other of the one of the first and second members, the spring tab and ramp in overlapping relationship in the normal closed hood position and the normal opened hood position, the spring tab and ramp configured to slide relative to one another while the second member pivots about the member pin relative to the first member to an opened hood collision position in response to a collision input, the spring tab engaging a hold surface in the opened hood collision position maintaining an angular position between the first and second members.

6. A pedestrian protection automotive hinge comprising:
   a first hinge portion;
   a second hinge portion includes first and second members secured to one another by a member pin, one of the first and second members has a slot with opposing first and second ends;
   first and second linkages spaced apart from one another and each pivotally interconnected to the first hinge portion and the first member, the first and second linkages configured to permit movement of the first and second hinge portions relative to one another between a normal closed hood position and a normal opened hood position; and
   a hold assembly which includes a spring tab on one of the first and second members, and a ramp on the other of the one of the first and second members, the spring tab and ramp in overlapping relationship in the normal closed hood position and the normal opened hood position, the spring tab and ramp configured to slide relative to one another while the second member pivots about the member pin relative to the first member to an opened hood collision position in response to a collision input, the spring tab engaging a hold surface in the opened hood collision position and maintaining an angular position between the first and second members.

7. The hinge according to claim 6, wherein the spring tab and ramp respectively provide first and second surfaces engaging one another and that are configured to provide an increasing resistive force during deployment of the second member relative to the first member in response to the collision input.

8. The hinge according to claim 6, wherein the spring tab is configured to be deflected away from the first member when pivoting the second member about the member pin relative to the first member.

9. The hinge according to claim 6, wherein the spring tab is configured to be deflected toward the first member to a seated position and beyond a position of the spring tab in overlapping relationship with the ramp when in the opened hood collision position.

10. The hinge according to claim 6, wherein the spring tab includes an end abutting a hold surface provided on the first member when in the opened hood collision position.

11. The hinge according to claim 6, comprising a release assembly that includes a clip supported at one of the first and second ends, and a stop pin supported by the other of the one of the first and second members, the stop pin captured in the clip in the normally closed position and the normally opened position, the stop pin configured to break the clip in response to a collision input permitting the second member to pivot about the member pin relative to the first member to a opened hood collision position and the stop pin to move to the second end of the slot.

12. A method of deploying a pedestrian protection automotive hinge, the method comprising the steps of:
    activating an actuator in response to a collision input to drive a vehicle hood upward;
    breaking a clip with a stop pin and moving the stop pin along a slot while pivoting a second member relative to a first member about a member pin; and
    holding the vehicle hood in an opened hood collision position.

13. The method according to claim 12, comprising a step of engaging the second member with the actuator to initiate the clip breaking step.

14. The method according to claim 12, comprising a step of moving the stop pin downward in a slot.

15. The method according to claim 12, wherein the holding step includes seating a spring tab on a hold surface.

16. A method of deploying a pedestrian protection automotive hinge, the method comprising the steps of:
    activating an actuator in response to a collision input to drive a vehicle hood upward;
    sliding a spring tab relative to a ramp while pivoting a second member relative to a first member about a member pin;
    holding the vehicle hood in an opened hood collision position by seating the spring tab on a hold surface; and
    breaking a clip with a stop pin and moving the stop pin along a slot while pivoting the second member relative to the first member about the member pin in response to the activating step.

17. The method according to claim 16, wherein the spring tab sliding step includes deflecting the spring tab with the ramp away from the first member.

18. The method according to claim 16, wherein the holding step includes seating an end of the spring tab onto a hold surface of the first member to maintain the opened hood collision position.

* * * * *